(12) United States Patent
Nishie

(10) Patent No.: US 7,359,792 B2
(45) Date of Patent: Apr. 15, 2008

(54) METHOD AND APPARATUS FOR INITIALIZING INJECTORS

(75) Inventor: Noriyasu Nishie, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/638,465

(22) Filed: Dec. 14, 2006

(65) Prior Publication Data

US 2007/0142998 A1 Jun. 21, 2007

(30) Foreign Application Priority Data

Dec. 15, 2005 (JP) ............................. 2005-361862

(51) Int. Cl.
*B60T 7/12* (2006.01)
*F02M 51/00* (2006.01)

(52) U.S. Cl. ................. 701/104; 123/480; 123/674

(58) Field of Classification Search ............... 701/101, 701/103, 104, 105; 123/434, 674, 478, 480; 73/119 A
See application file for complete search history.

(56) References Cited

U.S. PATENT DOCUMENTS

| | | | | | |
|---|---|---|---|---|---|
| 4,197,767 | A | * | 4/1980 | Leung | ........................ 477/98 |
| 4,276,602 | A | * | 6/1981 | Obara et al. | ................. 701/115 |
| 4,277,829 | A | * | 7/1981 | Tokuda et al. | ............... 701/101 |
| 4,309,759 | A | * | 1/1982 | Tokuda et al. | ............... 701/105 |
| 4,312,038 | A | * | 1/1982 | Imai et al. | ................... 701/115 |
| RE32,140 | E | * | 5/1986 | Tokuda et al. | ............... 701/115 |
| RE32,163 | E | * | 5/1986 | Tokuda et al. | ............... 701/114 |

FOREIGN PATENT DOCUMENTS

| | | |
|---|---|---|
| JP | 2000-501155 | 2/2000 |
| JP | 2002-180897 | 6/2002 |
| WO | 97/20136 | 6/1997 |

* cited by examiner

*Primary Examiner*—John T. Kwon
(74) *Attorney, Agent, or Firm*—Nixon & Vanderhye P.C.

(57) ABSTRACT

In an apparatus for initializing injectors based on pieces of correction data each corresponding to one of the injectors, an obtaining unit obtains injection characteristics of the injectors using temporally-input pieces of data as the pieces of correction data. The temporarily-input pieces of data correspond to the individual injectors. The injection characteristic of each injector depends on the injection quantity thereof. A matching unit executes determination of whether the obtained injection characteristics are substantially matched with each other. The matching unit also executes interchange of at least two of the temporarily-input pieces of data with each other, thereby obtaining injection characteristics of the injectors based on the temporarily-input pieces of data whose at least two pieces of data are interchanged with each other.

13 Claims, 5 Drawing Sheets

METHOD AND APPARATUS FOR INITIALIZING INJECTORS

CROSS REFERENCE TO RELATED APPLICATION

This application is based on Japanese Patent Application 2005-361862 filed on Dec. 15, 2005. This application aims at the benefit of priority from the Japanese Patent Application, so that the descriptions of which are all incorporated herein by reference.

BACKGROUND OF THE INVENTION

1. Field of the Invention

The present invention relates to methods and apparatuses for initializing injectors based on temporarily input correction values for the injectors.

2. Description of the Related Art

Conventional methods of initializing a fuel injection system with an injector for each cylinder of an engine are disclosed, for example, in International Unexamined Patent Publication No. WO97/20136 corresponding to National Publication of Translated Version No. 2000-501155.

Such conventional initializing methods include a step of storing beforehand in a storage medium a unique correction value previously determined for each injector such that the correction value is associated with an identifier of a corresponding one of the cylinders.

The correction values of the individual injectors are required to determine fuel-quantity parameters including optimum fuel injection timings and optimum fuel injection periods for the individual injectors; these fuel-quantity parameters are required to equalize fuel-injection quantities therefrom.

After the initialization, the fuel-injection parameters including the optimum fuel injection timings and the optimum fuel injection periods are computed based on the unique correction values of the individual injectors stored in the storage medium. Accordingly, the individual injectors are precisely controlled based on the corresponding fuel-injection parameters so that actual fuel injection quantities from the injectors are equalized to each other.

In the conventional methods of initializing a fuel injection system with an injector for each cylinder of an engine, an operator manipulates a writing device to write a unique correction value for each injector (each cylinder) into a computer-accessible storage medium so that it is stored therein. For this reason, there is the possibility that the operator manipulates the writing device to write wrong correction data for at least one injector (at least one cylinder) into the computer-accessible storage medium.

In this wrong correct-value writing case, in the at least one cylinder, the wrong correct value stored in the storage medium and a real correct value uniquely determined for the at least one injector corresponding to the at least one cylinder have a gap therebetween.

When the fuel-injection parameters are computed based on the wrong correction data of the at least one injector, the gap may therefore cause nonuniform distributions between the fuel quantities of the injectors.

It is to be noted that Japanese Unexamined Patent Publication No. 2002-180897 focuses on identification of an information storage medium in which correction values are stored in advance, which is probably different from the injection-quantity distribution problem.

SUMMARY OF THE INVENTION

In view of the background, an object of at least one aspect of the present invention is to provide methods and apparatuses capable of equalizing injection quantities from individual injectors independent of operator's incorrect-input of at least one piece of unique correction data for at least one injector.

According to one aspect of the present invention, there is provided a method of initializing a plurality of injectors using pieces of correction data each corresponding to one of the injectors. The pieces of correction data are uniquely determined for the injectors, respectively. The pieces of correction data are required to equalize injection quantities from the injectors. The method includes (a) obtaining injection characteristics of the injectors based on temporally-input pieces of data as the pieces of correction data. The temporarily-input pieces of data correspond to the individual injectors. The injection characteristic of each of the injectors depends on the injection quantity hereof. The method also includes (b) determining whether the obtained injection characteristics are substantially matched with each other, and (c) interchanging at least two of the temporarily-input pieces of data with each other when it is determined that the obtained injection characteristics are at least partially mismatched with each other. The method further includes (d) obtaining injection characteristics of the injectors based on the temporally-input pieces of data whose at least two pieces of data are interchanged with each other, and (e) determining whether the obtained injection characteristics by the step (d) are substantially matched with each other.

According to another aspect of the present invention, there is provided an apparatus for initializing a plurality of injectors based on pieces of correction data corresponding to the respective injectors. The pieces of correction data are uniquely determined for the injectors, respectively, and are required to equalize injection quantities therefrom. The apparatus includes an obtaining unit configured to obtain injection characteristics of the injectors based on temporally-input pieces of data as the pieces of correction data. The temporarily-input pieces of data correspond to the individual injectors. The injection characteristic of each of the injectors depends on the injection quantity thereof. The apparatus includes a determining unit configured to determine whether the obtained injection characteristics are substantially matched with each other. The apparatus also includes a matching unit configured to execute:

interchange of at least two of the temporarily-input pieces of data with each other so as to obtain injection characteristics of the injectors based on the temporally-input pieces of data whose at least two pieces of data are interchanged with each other when it is determined that the obtained injection characteristics are at least partially mismatched with each other; and determination of whether the obtained injection characteristics are substantially matched with each other.

According to a further aspect of the present invention, there is provided a program product embedded in a media accessible by a computer for initializing a plurality of injectors based on pieces of correction data corresponding to the individual injectors. The pieces of correction data are uniquely determined for the respective injectors and being required to equalize injection quantities therefrom. The program product is configured to cause a computer to execute the following instructions of:

(a) obtaining injection characteristics of the injectors based on temporally-input pieces of data as the pieces of correction data, the temporarily-input pieces of data corresponding to the individual injectors, the injection characteristic of each of the injectors depending on the injection quantity thereof;

(b) determining whether the obtained injection characteristics are substantially matched with each other;

(c) interchanging at least two of the temporarily-input pieces of data with each other when it is determined that the obtained injection characteristics are at least partially mismatched with each other;

(d) obtaining injection characteristics of the injectors based on the temporarily-input pieces of data whose at least two pieces of data are interchanged with each other; and (e) determining whether the obtained injection characteristics by the instruction (d) are substantially matched with each other;

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
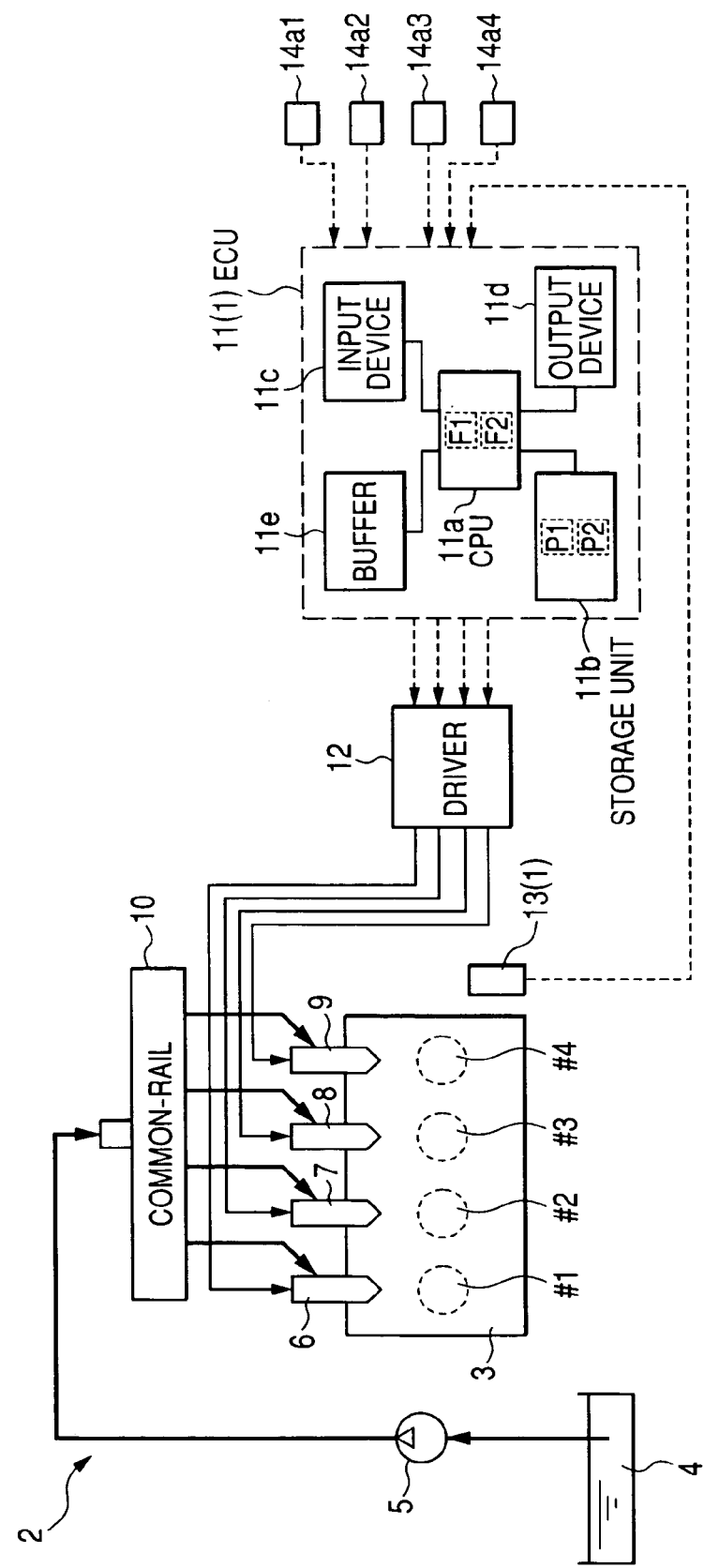
FIG. 1 is a view schematically illustrating an example of the structure of a fuel injection system according to an embodiment of the present invention.
Figure 2:
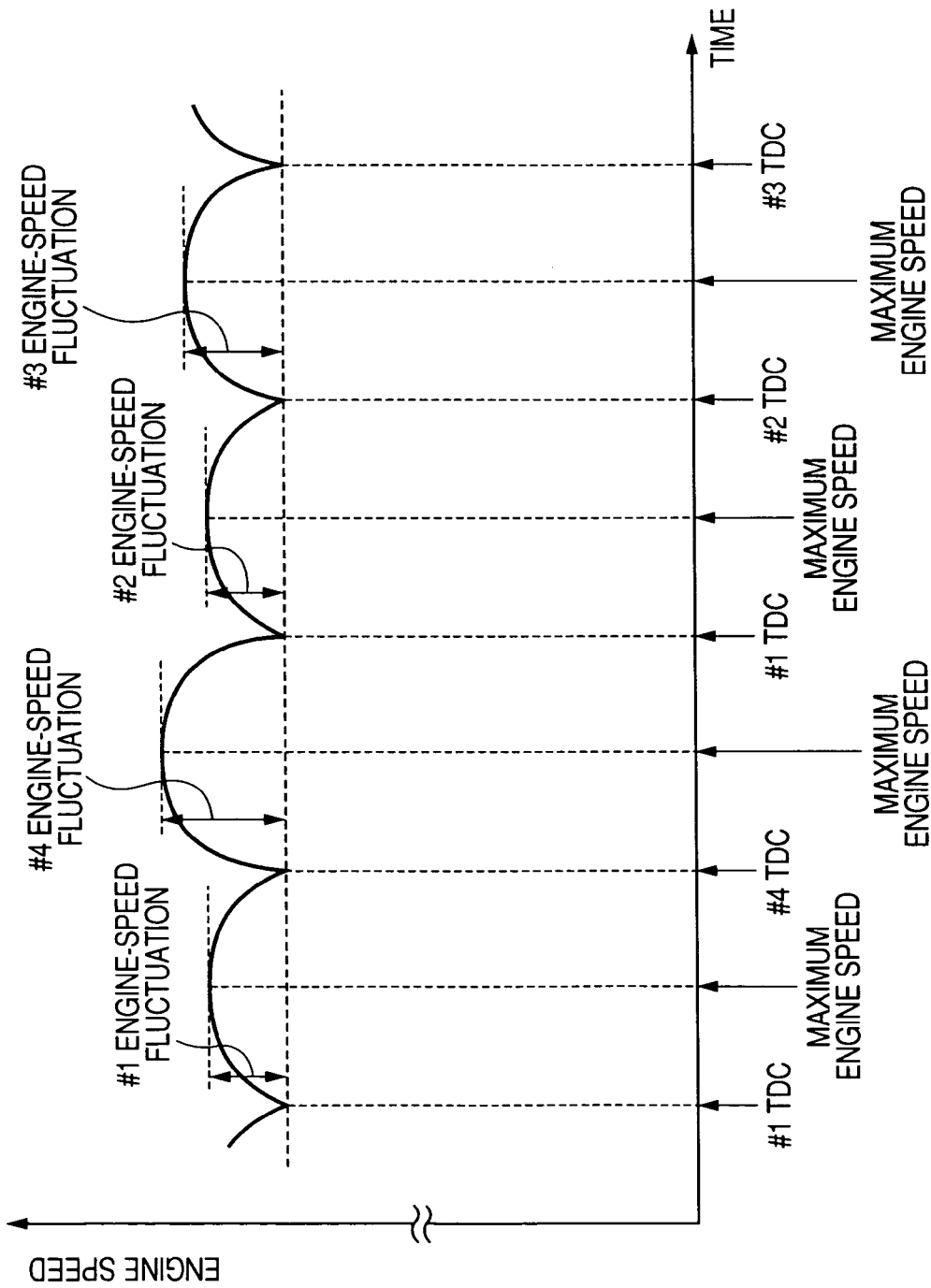
FIG. 2 is a graph schematically illustrating fluctuations of an engine speed over time according to the embodiment.

Referring to FIG. 1, there is illustrated an injector initialization apparatus 1 and a fuel injection system 2 in which the injector initialization apparatus 1 is installed beforehand. The injector initialization apparatus 1 is installed in advance in, for example, a vehicle.

The fuel injection system 2 is for example designed to supply fuel to a direct fuel-injection engine 3, such as a diesel engine, installed in the vehicle.

The fuel injection system 2 is equipped with a fuel tank 4, a fuel pump 5, a number of, such as four, injectors 6 to 9, a common-rail 10, an ECU 11, and a driver 12.

The fuel tank 4 is a container made of, for example, metal and/or plastic. Fuel is stored in the fuel tank 4.

The fuel pump 5 is, for example, a mechanical and/or electrical device, and is communicably coupled to the fuel tank 4 and the common-rail 10. The fuel pump 5 is designed to draw fuel stored in the fuel tank 4 therefrom, to pressurize the drawn fuel, and to deliver it to the common-rail 10.

The common-rail 10 is communicably coupled to each of the injectors 6 to 9, and serves as an accumulator.

Specifically, the common-rail 10 is operative to accumulate the fuel delivered from the fuel pump 5 therein with its pressure kept high. The common-rail 10 is also operative to uniformly feed the fuel accumulated therein to the individual injectors 6 to 9.

The injectors 6 to 9 are installed in respectively corresponding cylinders #1 to #4 of the engine 3 and operative to meter fuel in the respectively corresponding cylinders #1 to #4 thereof.

Specifically, each of the injectors 6 to 9 consists essentially of, for example, a housing, a valve arranged to be openable and closeable in a port of the housing communicated with a corresponding cylinder, and an actuator mechanically linked thereto.

For example, when energized, the actuator is operative to move the valve from a port-close position against a biasing force, such as a spring force, to open the port so that the fuel fed from the common-rail 10 is delivered to the corresponding cylinder.

In contrast, when power supply is interrupted to the actuator, the valve is configured to be automatically returned to the port-close position to close the port by the biasing force (spring force).

The ECU 11 includes a microcomputer. The microcomputer consists essentially of a CPU 11a operative to execute various tasks, a storage unit 11b replaceably or permanently integrated with at least one of various types of storage media, such as a volatile/nonvolatile storage medium, an input device 11c, an output device 11d, and a temporary storage, such as a buffer 11e. The CPU 11a is connected to the storage unit 11b, the input device 11c, the output device 11d, and the buffer 11e.

The input device 11c allows an operator to input various items of information to the CPU 11a. The output device 11d is operative to externally output data sent from the CPU 11a.

The buffer 11d allows the CPU 11a to be quickly accessible thereto. The buffer 11d is operative to temporarily store data sent from the CPU 11a.

The ECU 11 is connected to the driver 12, and programmed to control, via the driver 12, the drive of the fuel pump 5, and that of each of the injectors 6 to 9. Specifically, in order to drive each of the injectors 6 to 9, the ECU 11 works to send control command signals to the driver 12.

The driver 12 is connected to the actuators of the injectors 6 to 9 and operative to receive the control command signals sent from the ECU 11 and to supply power to the actuators of individual injectors 6 to 9 based on the control command signals.

In the fuel injection system 2, the injector initialization apparatus 1 is composed of the ECU 11 and a sensor 13 for measuring injection characteristics associated with fuel injection of each injector. The "fuel characteristics" mean variables depending on the injection quantity from each of the injectors 6 to 9, such as engine-speed fluctuation and/or the fuel pressure in the common rail 10.

In the embodiment, the sensor 13 serves as a normal crank angle sensor operative to measure data indicative of a crank angle of a crankshaft of the engine at, for example, regular intervals, and to output, to the ECU 11, the measured data every measurement timing.

It is to be noted that other sensors 14 are installed beforehand in the vehicle and arranged to measure various types of physical quantities. These physical quantities are required for the ECU 11 to execute fuel injection control of each cylinder. For example, the other sensors 14 include an airflow meter 14a1, a throttle position sensor 14a2, an engine-coolant temperature sensor 14a3, and a common-rail pressure sensor 14a4.

The ECU 11 is programmed to:

periodically compute the engine speed based on the periodically measured data sent from the sensor 13; and compute the engine-speed fluctuation based on the computed engine speeds.

In the embodiment, the "engine-speed fluctuation" means an increment of the engine speed depending on one fuel injection of each of the injectors 6 to 9.

For example, when the piston of the cylinder #1 reaches top dead center (TDC) so that fuel is injected from the corresponding injector 6, combustion of air and the fuel in the cylinder #1 begins with increase of the engine speed. When the engine speed reaches its maximum value, the engine speed starts to decrease.

Thereafter, in the cylinder #4 determined as the next combustion in a predetermined combustion cycle, when the piston of the cylinder #4 reaches TDC so that fuel is injected from the corresponding injector 9, combustion of air and the fuel in the cylinder #4 begins with increase of the engine speed. When the engine speed reaches its maximum value, the engine speed starts to decrease.

Specifically, in each of the remaining cylinders #2 and #3, combustion of the air/fuel mixture occurs in the order of the cylinder #2 and the cylinder #3.

In each combustion cycle in which the engine speed increases and decreases over time, the engine-speed fluctuation of each cylinder is determined as the difference between the maximum value of the engine speed due to the fuel injection into each cylinder and a value of the engine speed when each piston reaches TDC in each cylinder.

The ECU 11 has an injection characteristic obtaining function F1 and a correction data interchanging determining function F2. At least one program (test mode program) P1 stored in the storage unit 11b causes the CPU 11a to implement the injection characteristic obtaining function F1 and the correction data interchanging determining function F2 in a test mode.

In other words, the CPU 11a works to execute the test mode program P1 to implement the injection characteristic obtaining function F1 and the correction data interchanging determining function F2 in the test mode.

After completion of run of the test mode program P1, the CPU switches from the test mode to a normal operation mode. In the normal operation mode, at least one program (normal operation mode program) P2 stored in the storage unit 11b causes the CPU 11a to execute normal injection control of individual injectors 6 to 9.

In the embodiment, pieces of unique correction data were previously determined for the individual injectors 6 to 9 to match the fuel injection characteristics of the injectors 6 to 9 with each other during, for example, development on test beds.

Preferably, the CPU 11a of the ECU 11 is programmed to operate in the test mode in response to temporal input of the pieces of correction data respectively corresponding to the cylinders #1 to #4 thereto by an operator with, for example, the input device 11c after respective installation of the injectors 6 to 9 in the corresponding cylinders #1 to #4.

The injection characteristic obtaining function F1 is a function of obtaining injection characteristics of each injector based on the temporarily input pieces of correction data before the temporarily input pieces of correction data are stored in the storage unit 11b to be associated respectively with corresponding identifiers of the cylinders #1 to #4.

For example, in the embodiment, the injection characteristic obtaining function F1 is designed to obtain an injector-to-injector engine-speed fluctuation as one of the injection characteristics of each injector based on the temporarily input pieces of correction data.

There are typical first and second ways to obtain the injector-to-injector engine-speed fluctuation as one of the injection characteristics of each injector.

As the first way, after activation of the engine, the CPU 11a works to control the driver 12 to sequentially drive the injectors 6 to 9 in the combustion cycle to thereby sequentially deliver fuel into the cylinders #1 to #4. This makes it possible, as described above, for the ECU 11 to obtain the engine-speed fluctuation of each cylinder based on the periodically measured data sent from the sensor 13 (see FIG. 3).

As the second way, the ECU 11 works to simulate the engine-speed fluctuation of each cylinder based on an engine model installed in the ECU 11 or another computing unit accessible by the ECU 11.

The correction data interchanging determining function F2 is designed to execute the steps of:

(a) determining whether the pieces of correction data are required to be interchanged between at lest one pair of the cylinders #1 to #4 based on the difference between any pair of the obtained injection characteristics (engine-speed fluctuations);

(b) interchanging pieces of correction data corresponding to at least one pair of the cylinders #1 to #4 with each other when it is determined that the pieces of correction data are required to be interchanged between the at least one pair of the cylinders #1 to #4;

(c) causing the injection characteristic obtaining function F1 to obtain again the injection characteristics of each injector based on the temporarily input pieces of correction data whose pieces of correction data of at least one pair of the cylinders #1 to #4 have been interchanged; and (d) repeating the steps (a) to (c) until it is determined that the pieces of correction data are not required to be interchanged between any two of the cylinders #1 to #4.

Preferably, in the step (a), the correction data interchanging determining function F2 is designed to compare the difference between any pair of the obtained engine-speed fluctuations with a predetermined acceptable threshold level previously set to be stored in the storage unit 11b of the ECU 11.

For example, the acceptable threshold level has been determined based on the degree of fuel-control accuracy needed to the fuel injection system 2 (the vehicle).

Based on the compared result, when determining that the difference between at least one pair of the obtained engine-speed fluctuations with the acceptable threshold level, the correction data interchanging determining function F2 is designed to interchange one engine-speed fluctuation of one of the at least one pair of engine-speed fluctuations with the other thereof.

Next, operations of the injector initialization apparatus 1 will be described hereinafter.

When the pieces of correction data and the corresponding identifiers of the cylinders #1 to #4 are input to the CPU 11a by an operator with, for example, the input device 11c, the CPU 11a temporarily stores the temporarily input pieces of correction data and the corresponding identifiers of the cylinders #1 to #4 in the buffer 11e.

Then, the CPU 11a runs the test mode program P1 to switch to the test mode, thereby executing a test mode task in accordance with the test mode program P1.

Figure 3:
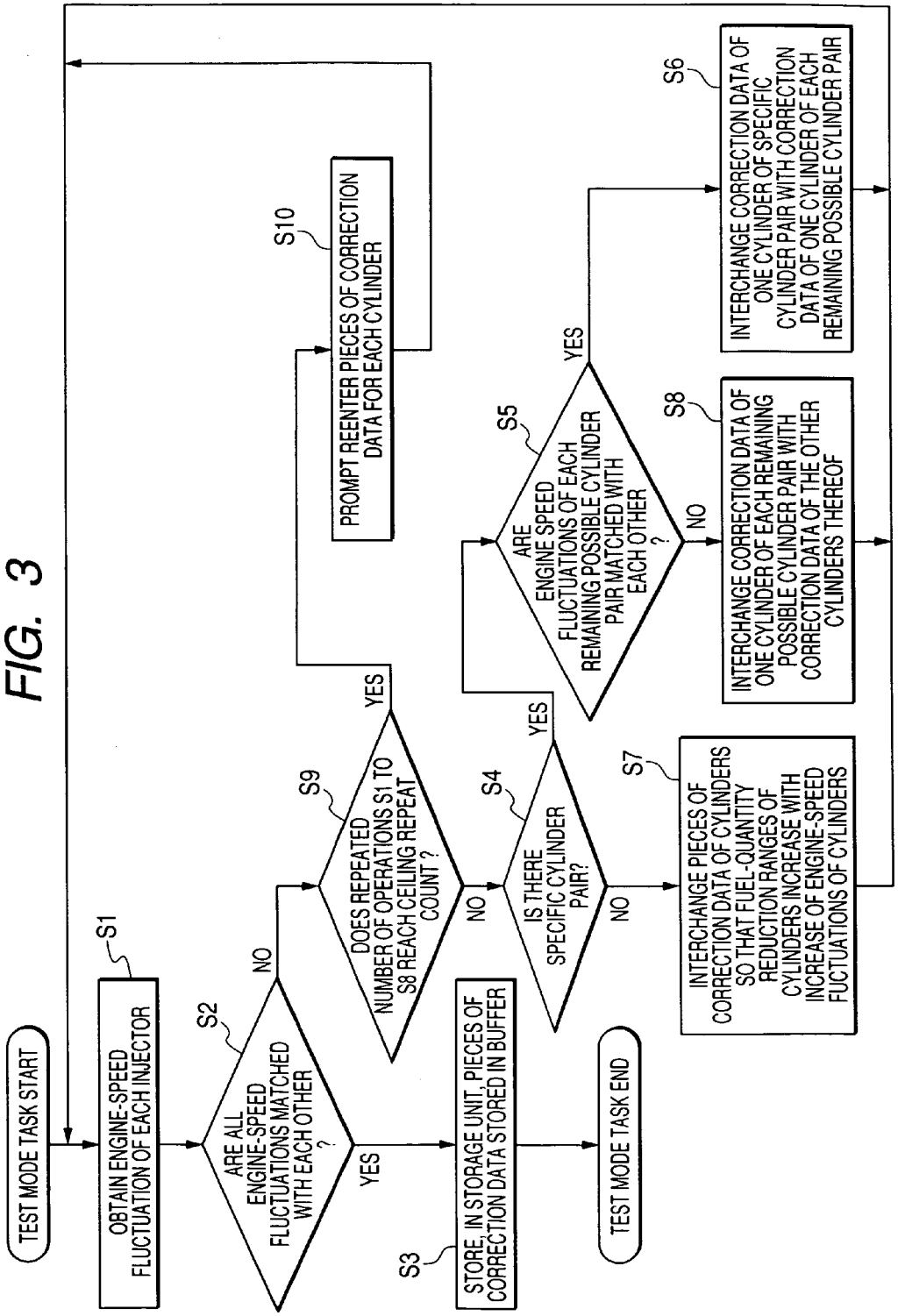
FIG. 3 is a flowchart schematically illustrating a test mode task to be executed by an ECU illustrated in FIG. 1 according to the embodiment.

In the test mode task, the CPU 11a uses one of the first and second ways to thereby obtain the engine-speed fluctuation of each of the injectors 6 to 9 corresponding to the cylinders #1 to #4 (step S1 in FIG. 3).

Next, the CPU 11a determines whether all of the engine-speed fluctuations corresponding to the cylinders #1 to #4 are matched with each other in step S2.

Figure 4:
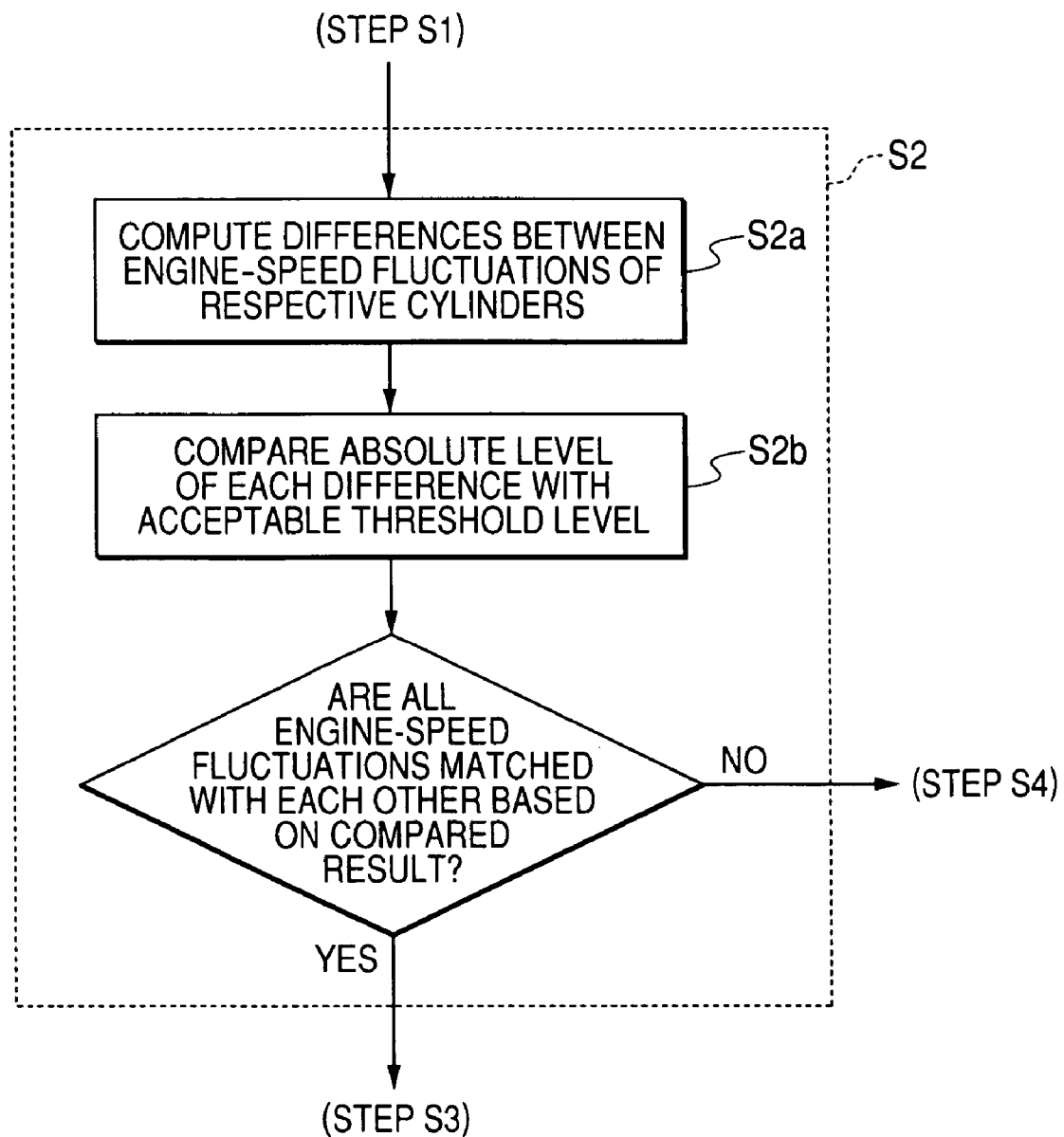
FIG. 4 is a flowchart schematically illustrating a subroutine of part of the test mode task illustrated in FIG. 3 according to the embodiment.

Specifically, as an example of the determination step S2, as illustrated by step S2a in FIG. 4, the CPU 11a computes: a first difference between the engine-speed fluctuations of the cylinders #1 and #2, a second difference between the engine-speed fluctuations of the cylinders #1 and #3, and a third difference between the cylinders #1 and #4, a fourth difference between the engine-speed fluctuations of the cylinders #2 and #3, a fifth difference between the engine-speed fluctuations of the cylinders #2 and #4, and a sixth difference between the engine-speed fluctuations of the cylinders #3 and #4 in step S2a of FIG. 4.

Next, the CPU 11a compares the absolute level of each of the first to sixth differences with the acceptable threshold level in step S2b.

If the absolute level of each of the first to sixth differences is equal to or lower than the acceptable threshold level in step S2b based on the compared result, the CPU 11a determines that all of the engine-speed fluctuations corresponding to the cylinders #1 to #4 are matched with each other in step S2b (the determination in step S2b is YES). In other words, the CPU 11a determines that the pieces of correction data corresponding to the respective cylinders #1 to #4 are properly input to the CPU 11a.

After the affirmative determination in step S2 (S2b), the CPU 11a stores, in the storage unit 11b, the pieces of correction data stored in the buffer 11e such that the pieces of correction data are associated with the corresponding identifiers of the cylinders #1 to #4 in step S3. After completion of the operation in step S3, the CPU 11a exits the test mode task.

Otherwise if the absolute level of at least one of the first to sixth differences is higher than the acceptable threshold level in step S2b based on the compared result, the CPU 11a determines that the engine-speed fluctuations corresponding to the cylinders #1 to #4 are at least partly mismatched with each other in step S2b (the determination in step S2b is NO). In other words, the CPU 11a determines that at least one of the pieces of correction data corresponding to the respective cylinders #1 to #4 is improperly input to the CPU 11a.

Then, the CPU 11a proceeds to step S4.

In step S4, the CPU 11a determines whether there is at least one pair of the cylinders #1 to #4 whose corresponding engine-speed fluctuations are matched with each other. The paired cylinders whose engine-speed fluctuations are matched with each other will be referred to as specific cylinder pair.

Specifically, in step S4, the CPU 11a determines whether there is at least one of the first to sixth differences whose absolute level is equal to or lower than the acceptable threshold level.

If it is determined that at least one of the first to sixth differences whose absolute level is equal to or lower than the acceptable threshold level, the CPU 11a determines that there is at least one specific cylinder pair in the cylinders #1 to #4 (the determination in step S4 is YES). Then, the CPU 11a proceeds to step S5.

Otherwise if it is determined that there is none of the first to sixth differences whose absolute level is equal to or lower than the acceptable threshold level, the CPU 11a determines that there are no specific paired cylinders in the cylinders #1 to #4 (the determination in step S4 is NO). Then, the CPU 11a proceeds to step S7.

In step S5, the CPU 11a determines whether the engine-speed fluctuations of each of the remaining possible cylinder pairs except for the specific cylinder pair(s) are matched with each other.

Specifically, in step S5, the CPU 11a determines whether the absolute levels of the remaining differences corresponding to the remaining possible cylinder pairs are individually equal to or lower than the acceptable threshold level.

If it is determined that the absolute levels of the remaining differences are individually equal to or lower than the acceptable threshold level, the CPU 11a determines that the engine-speed fluctuations of each of the remaining possible cylinder pairs are matched with each other (the determination in step S5 is YES). Then, the CPU 11a proceeds to step S6.

Otherwise if it is determined that the absolute level of at least one of the remaining differences is higher than the acceptable threshold level, the CPU 11a determines that the engine-speed fluctuations of each of the remaining possible cylinder pairs are mismatched with each other (the determination in step S5 is NO). Then, the CPU 11a proceeds to step S8.

In step S6, the CPU 11a interchanges the piece of correction data corresponding to one cylinder of the at least one specific cylinder pair with the piece of correction data corresponding to one cylinder of each of the remaining possible cylinder pairs such that the one cylinder of the at least one specific cylinder pair is different from the one cylinder of each of the remaining possible cylinder pairs.

Thereafter, the CPU 11a temporarily restores the interchanged pieces of correction data in the buffer 11e, returning to step S1 to execute the operation in step S1.

In step S7, the CPU 11a interchanges the pieces of correction data corresponding to the cylinders #1 to #4 so that the fuel-quantity reduction ranges corresponding to the cylinders #1 to #4 increase with increase of the engine-speed fluctuations corresponding to the cylinders #1 to #4. Then, the CPU 11a stores the interchanged pieces of correction data in the buffer 11e.

For example, it is assumed that the greater the magnitudes of the pieces of correction data, such as the absolute values of the pieces of correction data, become, the lower the injection quantities corresponding to the cylinders #1 to #4 become.

In this assumption, the CPU 11a works to:

interchange the pieces of correction data corresponding to the cylinders #1 to #4 so that the pieces of correction data corresponding to the cylinders #1 to #4 arranged in the order of the magnitude of each piece of correction data from the lowest to the greatest are sequentially associated with the identifiers of the cylinders #1 to #4; these identifiers are arranged in the order of the engine-speed fluctuation corresponding to each cylinder from the highest to the lowest; and temporarily restore, in the buffer 11e, the pieces of correction data associated with the identifiers of the cylinders #1 to #4, returning to step S1 to execute the operation in step S1.

In step S8, the CPU 11a interchanges the piece of correction data corresponding to one cylinder of each of the remaining possible cylinder pairs with the piece of correction data corresponding to the other cylinder of each of the remaining possible cylinder pairs such that the one cylinder and the other cylinder of each of the remaining possible cylinder pairs are different from each other.

Thereafter, the CPU 11a temporarily restores the interchanged pieces of correction data in the buffer 11e, returning to step S1 to execute the operation in step S1.

The CPU 11a repeats the operations in steps S1 to S8 up to a ceiling of a predetermined repeat count until it is determined that all of the engine-speed fluctuations corresponding to the cylinders #1 to #4 are matched with each other in step S2.

If it is determined that all of the engine-speed fluctuations corresponding to the cylinders #1 to #4 are matched with each other in step S2 during repeat of the operations in steps S1 to S8 before the number of repetitions of the operations in steps S1 to S8 reaches the ceiling repeat count (the determination is NO in step S9), the CPU 11a executes the operation in step S3.

This allows the pieces of correction data associated with the corresponding identifiers of the cylinders #1 to #4 temporarily stored in the buffer 11e to be stored in the storage unit 11b. Thereafter, the CPU 11a exits the test mode task.

On the other hand, in step S9, if it is determined that the number of repetitions of the operations in S1 to S8 reaches the ceiling repeat count though before the determination in step S2 is positive (the determination in step S9 is YES), the CPU 11a goes to step S10. In step S10, the CPU 11a prompts reenter of pieces of correction data corresponding to the cylinders #1 to #4 by, for example, producing a beeping sound indicating the occurrence of a correction-value input error. Thereafter, the CPU 11a stands by for reenter of pieces of correction data for each cylinder (injector).

When pieces of correction data attached with the corresponding to the identifiers of the cylinders #1 to #4 are temporarily reentered by an operator with the input device 11c to the CPU 11a, the CPU 11a temporarily stores the temporarily reentered pieces of correction data attached with the corresponding to the identifiers of the cylinders #1 to #4 in the buffer 11e, going to step S1.

For example, in the embodiment, it is assumed that pieces D1, D2, and D4 of correction data corresponding to the cylinders #1, #2, and #4 are properly input to the ECU 11, but a piece D3 of correction data corresponding to the cylinder #3 is erroneously input thereto.

In this assumption, it is determined that the engine-speed fluctuations corresponding to the cylinders #1 to #4 are at least partly mismatched with each other (the determination in step S2 is NO).

In this case, it is determined whether there is at least one pair of the cylinders #1 to #4 whose engine-speed fluctuations are matched with each other in step S4.

In step S4, because of wrong input of the correction data D3 corresponding to the cylinder #3, it is determined that there are three specific cylinder pairs of:

(#1, #2) whose engine-speed fluctuations (F1, F2) are matched with each other;

(#1, #4) whose engine-speed fluctuations (F1, F4) are matched with each other; and (#2, #4) whose engine-speed fluctuations (F2, F4) are matched with each other (the determination in step S4 is YES).

Thereafter, in step S5, it is determined whether the engine-speed fluctuations of each of the remaining possible cylinder pairs of (#1, #3), (#2, #3), and (#3, #4) are matched with each other.

Assuming that the engine-speed fluctuations of each of the remaining possible cylinder pairs of (#1, #3), (#2, #3), and (#3, #4) are matched with each other, the determination in step S5 is YES.

Then, the piece of correction data corresponding to one cylinder of one of the three specific cylinder pairs of (#1, #2), (#1, #4), and (#2, #4) is interchanged with the piece of correction data corresponding to one cylinder of each of the three remaining possible cylinder pairs (#1, #3), (#2, #3), and (#3, #4) such that the one cylinder of the at least one specific cylinder pair is different from the one cylinder of each of the three remaining possible cylinder pairs (see step S6).

In the embodiment, when as one of the specific cylinder pairs, the specific cylinder pair (#1, #2) is selected, the piece of correction data corresponding to one cylinder of the specific cylinder pair (#1, #2) is interchanged with the piece of correction data corresponding to one cylinder of each of the three remaining possible cylinder pairs such that the one cylinder of the specific cylinder pair (#1, #2) is different from the one cylinder of each of the three remaining possible cylinder pairs.

For example, the piece D1 of correction data corresponding to one cylinder #1 of the specific cylinder pair (#1, #2) is interchanged with the piece D3 of correction data corresponding to one cylinder #3 of each of the three remaining possible cylinder pairs.

This allows the piece D1 of correction data to be associated with the cylinder #3, and the piece D3 of correction data to be associated with the cylinder #1.

Figure 5:
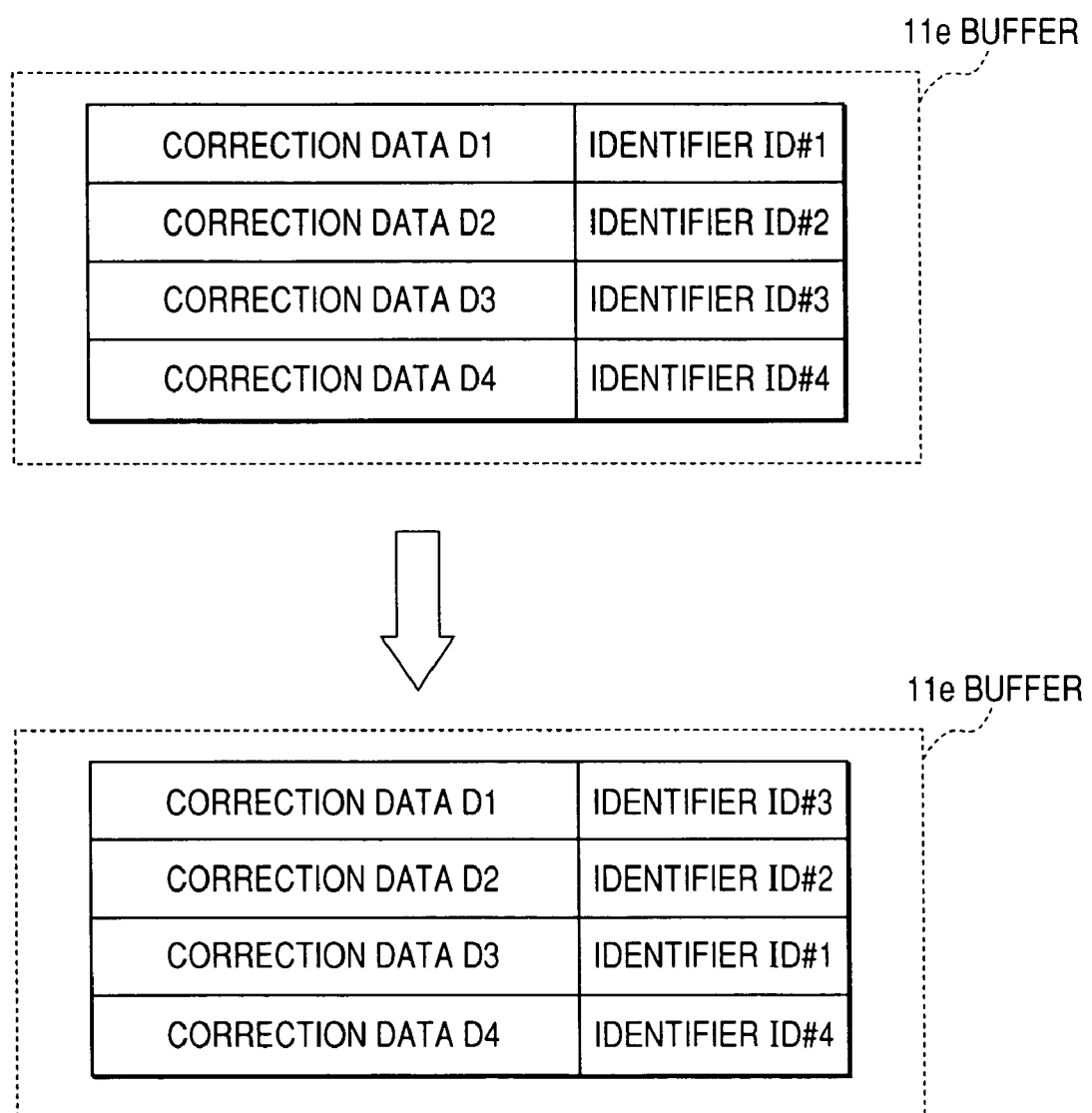
FIG. 5 is a view schematically illustrating an example of the structure of a buffer illustrated in FIG. 1.

Specifically, in the buffer 11e, before execution of the test mode task, as illustrated at the top side in FIG. 5, the pieces D1 to D4 of correction date are stored to be associated with the corresponding identifiers ID#1 to ID#4 of the cylinders #1 to #4, respectively.

After completion of the operations in sequential steps S1, S2, S4, S5, and S6 as set forth above, the pieces D1 and D3 of correction data are shuffled to be temporarily restored in the buffer 11e so that the piece D1 of correction data is associated with the identifier ID#3 of the cylinder #3 and the piece D3 of correction data is associated with the identifier ID#1 of the cylinder #1 (see step S6 in FIG. 3 and the bottom side in FIG. 5).

As described above, the ECU 11 constituting the injector initialization apparatus 1 includes the injection characteristic obtaining function F1 and the correction data interchanging determining function F2.

The injection characteristic obtaining function F1 is designed to obtain the engine-speed fluctuation of each injector based on the temporarily input pieces of correction data before the temporarily input pieces of correction data are stored in the storage unit 11b to be associated respectively with the corresponding identifiers of the cylinders #1 to #4.

The correction data interchanging determining function F2 is designed to execute the steps of:

(a) determining whether the pieces of correction data are required to be interchanged between at least one pair of the cylinders #1 to #4 based on the difference between any pair of the obtained engine-speed fluctuations;

(b) interchanging pieces of correction data corresponding to at least one pair of the cylinders #1 to #4 with each other when it is determined that the pieces of correction data are required to be interchanged between the pieces of correction data of at least one pair of the cylinders #1 to #4;

(c) causing the injection characteristic obtaining function F1 to obtain again the injection characteristics of each injector based on the temporarily input pieces of correction data whose pieces of correction data of at least one pair of the cylinders #1 to #4 have been interchanged; and (d) repeating the steps (a) to (c) until it is determined that the pieces of correction data are not required to be interchanged between any two of the cylinders #1 to #4, or it is determined that a predetermined time has elapsed since, for example, the start of repeat; this predetermine time corresponds to the number of repetitions of the operations in step S1 to S8.

Specifically, when pieces of correction data between at least one pair of cylinders are different from each other, interchange of the pieces of correction data between the at least one pair of cylinders allows the engine-speed fluctuation difference between the at least one pair of cylinders to be converged to become low in level, such as zero.

In addition, in the embodiment, the pieces of correction data for cylinders are temporarily input by an operator. For this reason, even if at least one piece of the correction data corresponding to at least one cylinder is erroneously input, interchange of the wrong entry piece of the correction data and a piece of the correction data corresponding to another one cylinder permits the engine-speed fluctuation difference between the at least one cylinder and another one cylinder to be converged to become low in level. This makes it possible to uniform the fuel quantities of the respective cylinders.

In addition, when the predetermined time has elapsed since, for example, the start of repeat before the determination in step S2 is YES, the correction data interchanging determining function F2 is designed to prompt reenter of pieces of correction data corresponding to the cylinders #1 to #4. This makes it possible to avoid that an extend period of time has elapsed since, for example, the start of executing the test mode task before the pieces of correction data are properly stored in the storage unit 11b.

Specifically, the correction data interchanging determining function F2 is operative to:

hold the predetermined acceptable threshold level; and interchange pieces of correction data corresponding to at least one pair of the cylinders with each other when it is determined that the difference between the pieces of correction data exceeds the acceptable threshold level.

Setting the acceptable threshold level based on the degree of fuel-control accuracy needed to the fuel injection system 2 (the vehicle) allows the fuel control to be carried out with the degree of fuel-control accuracy needed to the fuel injection system 2 being securely maintained.

In the injector initialization apparatus 1 according to the embodiment, the injection characteristic obtaining function F1 and the correction data interchanging determining function F2 have been installed, as functional modules, in the ECU 11, but the present invention is not limited to the structure. Specifically, the injection characteristic obtaining function F1 and the correction data interchanging determining function F2 can be installed in a computer-based system separately disposed from the ECU 11 and communicably coupled to the sensor 13 and the driver 12.

The injector initialization apparatus 1 according to the embodiment is designed to use the engine-speed fluctuation as the fuel characteristics of each cylinder, but the present invention is not limited to the structure.

Specifically, the injector initialization apparatus according to the present invention can be designed to use a variable depending on the change of the pressure in the common rail 3; this pressure change is periodically measured by the common-rail pressure sensor 14a4. For example, the injector initialization apparatus according to the present invention can be designed to use, as the variable, a difference between pressures in the common-rail 3 before and after fuel injection through each cylinder.

Moreover, the injector initialization apparatus according to the present invention can be designed to use a variable depending on the change of in the engine-coolant temperature; this temperature change is periodically measured by the common-rail pressure sensor 14a4. For example, the injector initialization apparatus according to the present invention can be designed to use, as the variable, a difference between engine-coolant temperatures before and after fuel injection through each cylinder.

In the embodiment, the injector initialization apparatus 1 is designed to initialize four injectors respectively installed in four cylinders, but can be designed to initialize a number of injectors, such as six or eight, injectors respectively installed a number of cylinders.

In the embodiment, the present invention is applied to the fuel injection system 2 capable of controlling injectors to deliver fuel into corresponding cylinders, but the present invention is not limited to the application.

Specifically, the present invention can be applied to a system capable of controlling injectors to deliver fluid into corresponding containers.

In addition, those skilled in the art will appreciate that the present invention is capable of being distributed as program products, for example, the programs stored in the storage unit 11b in a variety of forms. It is also important to note that the present invention applies equally regardless of the particular type of signal bearing media used to actually carry out the distribution. Examples of suitable signal bearing media include recordable type media such as CD-ROMs/RAMs, DVD-ROMs/RAMs, and flash memories, and transmission type media such as digital and analog communications links.

While there has been described what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A method of initializing a plurality of injectors using pieces of correction data each corresponding to one of the injectors, the pieces of correction data being uniquely determined for the injectors, respectively, and being required to equalize injection quantities from the injectors, the method comprising:
   (a) obtaining injection characteristics of the injectors based on temporally-input pieces of data as the pieces of correction data, the temporarily-input pieces of data corresponding to the individual injectors, the injection characteristic of each of the injectors depending on the injection quantity thereof;
   (b) determining whether the obtained injection characteristics are substantially matched with each other;
   (c) interchanging at least two of the temporarily-input pieces of data with each other when it is determined that the obtained injection characteristics are at least partially mismatched with each other;
   (d) obtaining injection characteristics of the injectors based on the temporarily-input pieces of data whose at least two pieces of data are interchanged with each other; and
   (e) determining whether the obtained injection characteristics by the step (d) are substantially matched with each other.

2. A method of initializing a plurality of injectors according to claim 1, further comprising repeating the steps (c) to (e) until it is determined that the obtained injection characteristics by the step (d) are substantially matched with each other.

3. A method of initializing a plurality of injectors according to claim 2, further comprising:
- counting a number of repetitions of the steps (c) to (e);
- determining whether the counted number reaches a predetermined ceiling; and
- prompting reenter of pieces of correction data for the respective injectors when it is determined that the counted number reaches the predetermined ceiling before it is determined that the obtained injection characteristics by the step (d) are substantially matched with each other.

4. A method of initializing a plurality of injectors according to claim 1, wherein the determining step includes:
- calculating differences between the obtained injection characteristics of the individual injectors to compare each of the obtained differences with a predetermined acceptable level, the determining step determining whether the obtained injection characteristics are substantially matched with each other based on the compared result.

5. A method of initializing a plurality of injectors according to claim 4, wherein the determining step determines that the obtained injection characteristics are at least partially mismatched with each other when at least one of the calculated differences exceeds the predetermined acceptable level.

6. An apparatus for initializing a plurality of injectors based on pieces of correction data each corresponding to one of the injectors, the pieces of correction data being uniquely determined for the injectors, respectively, and being required to equalize injection quantities from the injectors, the apparatus comprising:
- an obtaining unit configured to obtain injection characteristics of the injectors based on temporally-input pieces of data as the pieces of correction data, the temporarily-input pieces of data corresponding to the individual injectors, the injection characteristic of each of the injectors depending on the injection quantity thereof;
- a determining unit configured to determine whether the obtained injection characteristics are substantially matched with each other; and
- a matching unit configured to execute:
  - interchange of at least two of the temporarily-input pieces of data with each other so as to obtain injection characteristics of the injectors based on the temporally-input pieces of data whose at least two pieces of data are interchanged with each other when it is determined that the obtained injection characteristics are at least partially mismatched with each other; and
  - determination of whether the obtained injection characteristics are substantially matched with each other.

7. An apparatus for initializing a plurality of injectors according to claim 6, wherein the matching unit is configured to repeatedly execute the interchange and determination until the determination represents that the obtained injection characteristics of the injectors are substantially matched with each other.

8. An apparatus for initializing a plurality of injectors according to claim 7, further comprising:
- a counting unit configured to count a number of repetitions of the execution of the interchange and determination;
- a counted number determining unit configured to determine whether the counted number reaches a predetermined ceiling; and
- a prompting unit configured to prompt reenter of pieces of correction data for the respective injectors when it is determined that the counted number reaches the predetermined ceiling by the counted number determining unit before it is determined that the obtained injection characteristics of the injectors are substantially matched with each other by the determining unit.

9. An apparatus for initializing a plurality of injectors according to claim 6, wherein the matching unit further comprises:
- a calculating unit configured to calculate differences between the obtained injection characteristics of the individual injectors to compare each of the obtained differences with a predetermined acceptable level; and
- a determining unit configured to determine whether the obtained injection characteristics are substantially matched with each other based on the compared result.

10. An apparatus for initializing a plurality of injectors according to claim 9, wherein the determining unit is configured to determine that the obtained injection characteristics are at least partially mismatched with each other when at least one of the calculated differences exceeds the predetermined acceptable level.

11. A program product embedded in a media accessible by a computer for initializing a plurality of injectors based on pieces of correction data corresponding to the individual injectors, the pieces of correction data being uniquely determined for the respective injectors and being required to equalize injection quantities therefrom, the program product being configured to cause a computer to execute the following instructions of:
- (a) obtaining injection characteristics of the injectors based on temporally-input pieces of data as the pieces of correction data, the temporarily-input pieces of data corresponding to the individual injectors, the injection characteristic of each of the injectors depending on the injection quantity thereof;
- (b) determining whether the obtained injection characteristics are substantially matched with each other;
- (c) interchanging at least two of the temporarily-input pieces of data with each other when it is determined that the obtained injection characteristics are at least partially mismatched with each other;
- (d) obtaining injection characteristics of the injectors based on the temporally-input pieces of data whose at least two pieces of data are interchanged with each other; and
- (e) determining whether the obtained injection characteristics by the instruction (d) are substantially matched with each other.

12. A program product according to claim 11, wherein the program product is configured to cause a computer to further execute the step of repeating the instructions (c) to (e) until it is determined that the obtained injection characteristics by the instruction (d) are substantially matched with each other.

13. A program product according to claim 12, wherein the program product is configured to cause a computer to further execute the following steps of:
- counting a number of repetitions of the instructions (c) to (e);
- determining whether the counted number reaches a predetermined ceiling; and
- prompting reenter of pieces of correction data for the respective injectors when it is determined that the counted number reaches the predetermined ceiling before it is determined that the obtained injection characteristics by the instruction (d) are substantially matched with each other.

* * * * *